(12) United States Patent
Ye et al.

(10) Patent No.: US 8,555,205 B2
(45) Date of Patent: Oct. 8, 2013

(54) SYSTEM AND METHOD UTILIZED FOR HUMAN AND MACHINE INTERFACE

(75) Inventors: Zhou Ye, Foster City, CA (US);
Sheng-Wen Jeng, Tainan (TW);
Shun-Nan Liou, Kaohsiung (TW);
Ying-Ko Lu, Taoyuan County (TW)

(73) Assignee: Cywee Group Limited, Tortola (VG)

( * ) Notice: Subject to any disclaimer, the term of this patent is extended or adjusted under 35 U.S.C. 154(b) by 240 days.

(21) Appl. No.: 13/104,035

(22) Filed: May 10, 2011

(65) Prior Publication Data

US 2012/0086637 A1    Apr. 12, 2012

Related U.S. Application Data

(63) Continuation-in-part of application No. 12/901,372, filed on Oct. 8, 2010.

(51) Int. Cl.
*G06F 3/048* (2013.01)
(52) U.S. Cl.
USPC .......................................... 715/848; 715/863

(58) Field of Classification Search
USPC .................................................. 715/848, 863
See application file for complete search history.

(56) References Cited

U.S. PATENT DOCUMENTS

| | | | |
|---|---|---|---|
| 8,267,785 B2* | 9/2012 | Yamashita et al. | 463/36 |
| 2008/0143676 A1* | 6/2008 | Choi et al. | 345/158 |
| 2008/0291163 A1* | 11/2008 | Liberty | 345/156 |
| 2010/0105479 A1* | 4/2010 | Wilson et al. | 463/37 |
| 2010/0302142 A1* | 12/2010 | French et al. | 345/156 |
| 2010/0309119 A1* | 12/2010 | Yi et al. | 345/157 |
| 2010/0328210 A1* | 12/2010 | Jeng et al. | 345/157 |
| 2011/0001696 A1* | 1/2011 | Wilson | 345/156 |
| 2011/0181505 A1* | 7/2011 | Tseng et al. | 345/157 |

* cited by examiner

*Primary Examiner* — Omar Abdul-Ali
(74) *Attorney, Agent, or Firm* — Ding Yu Tan

(57) ABSTRACT

The present invention discloses a system for human and machine interface. The system includes a 3-dimensional (3D) image capture device, for capturing a gesture of a motion object in a period of time; a hand-held inertial device (HHID), for transmitting a control signal; and a computing device. The computing device includes a system integration and GUI module, for compensating the control signal according to an image signal corresponding to the motion object, to generate a compensated control signal.

18 Claims, 11 Drawing Sheets

SYSTEM AND METHOD UTILIZED FOR HUMAN AND MACHINE INTERFACE

CROSS REFERENCE TO RELATED APPLICATIONS

This is a continuation-in-part of U.S. application Ser. No. 12/901,372, which was filed on Oct. 8, 2010 and is included herein by reference.

BACKGROUND OF THE INVENTION

1. Field of the Invention

The invention relates to system and method utilized for human and machine interface, wherein the machine is an electronic system which may comprise software, firmware, controller and a computing hardware. More particularly, it is a hybrid solution of inertial and gesture detection in an image for interface between human and machine.

2. Description of the Prior Art

Referring to FIG. 1, a traditional computer gaming system 1 may include a display 12, a computing device 14 composed by an input/graphic user interface (GUI) module 141 and a display process unit 142, a human interface device (HID) 16 for a player 10 to interact with a software system, for example: a game, executed by the computing device 14. In such system, virtual reality of sport-like game is seldom obtained, due to the fact that controlling actions are accomplished only by an HID such as a mouse, a keyboard or a joystick. For example, playing a tennis game by sitting on chair and holding a mouse seems rarely real. Furthermore, for controlling complicated actions, one has to memorize functions of many buttons and practice a lot. Hence an entry-barrier is formed for children, the elder and less passionate people.

One solution for aforesaid problem is providing a gaming system 2 with a hand-held inertial HID 21 as shown in FIG. 2a to replace traditional HID, such as a mouse, a joystick and so on. The hand-held inertial HID 21 may also comprise buttons or joystick. A user 20 can swing the hand-held inertial HID 21 corresponding to the same action of the virtual role in the computing gaming system, and then the hand-held inertial HID 21 sends a control signal Con, such as an inertial signal, a button signal, via radio frequency (RF) wireless transmission to a control signal processing unit 23 for hand-held operation detection and identification. Then, the control signal processing unit 23 transmits processed hand-held operation information to a system integration and GUI module 241, which controls the display process unit 142 to show corresponding image on the display 12. Therefore, playing sport-like game, such as tennis, baseball or golf, is virtually realized by such design. Simultaneously, the complicated key controls are also replaced by one real action. As a result, all generations can enjoy one game together.

The limitations of inertial device are: (1) body moving control like running for a tennis ball requires button or joystick operation, thus virtual reality is somehow lost; (2) spontaneous body movement as a side effect of swinging the inertial device always influence the inertial system. Thus, these are objects of the invention to get correct inertial signal and improve virtual reality experience.

Meanwhile, a gaming system 2' shown by FIG. 2b includes a 3D image capture device 22 and an image signal processing unit 24, wherein the 3D image capturing device 22 consists of a camera or two. The gaming system 2' usually captures image/video of the user 20, e.g. a body, a hand or a face, and then may recognize the motion by an algorithm executed in the image signal processing unit 24, which then transmits an image signal Img (processed body motion information) to the system integration and GUI module 241. Then the system integration and GUI module 241 controls the display process unit 142 to show corresponding image on the display 12. However, motion detection has been researched for many years without being commercialized. Thus, there is a need for improvement of the prior art.

SUMMARY OF THE INVENTION

A hybrid solution which includes button control, inertial datum and motion detection may become more and more popular in the researching of human and machine interaction.

The present invention discloses a system for human and machine interface. The system includes a 3-dimensional (3D) image capture device, for capturing a gesture of a user in a period of time; a hand-held inertial device (HHID), for transmitting a control signal; and a computing device. The computing device includes a system integration and GUI module, for compensating the control signal according to an image signal corresponding to the user during the period of time, to generate a compensated control signal.

The present invention further discloses a method for human and machine interface. The method includes steps of capturing a gesture of a user in a period of time; receiving a control signal from a hand-held inertial device (HHID); and compensating the control signal according to an image signal derived by detecting the user during the period of time, to generate a compensated control signal.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

These and other objectives of the present invention will no doubt become obvious to those of ordinary skill in the art after reading the following detailed description of the preferred embodiment that is illustrated in the various figures and drawings.

DETAILED DESCRIPTION

Reference will now be made in detail to the present examples of the invention, examples of which are illustrated in the accompanying drawings. Wherever possible, the same reference numbers will be used throughout the drawings to refer to the same or like parts.

Figure 3:
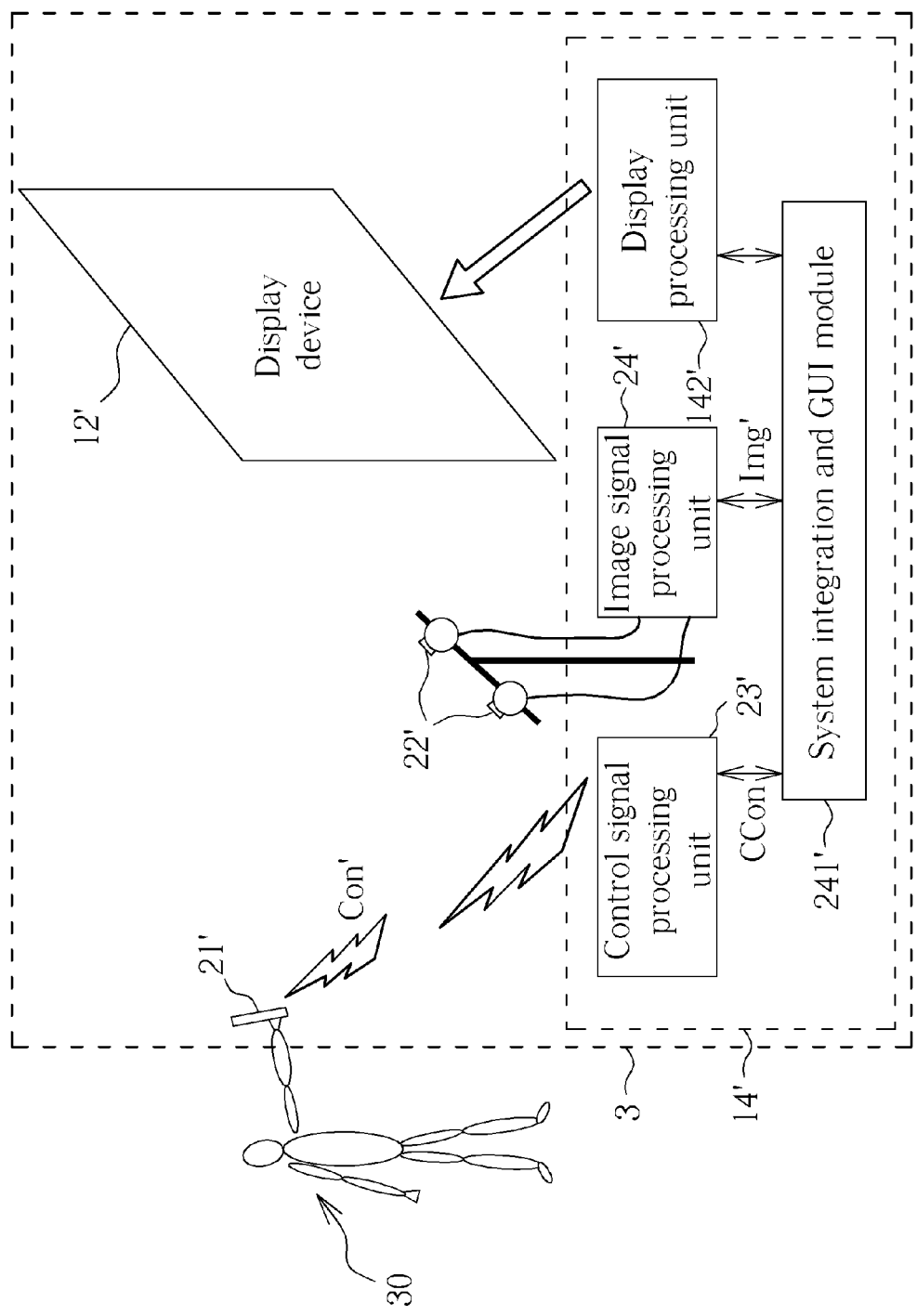
FIG. 3 is a schematic diagram of a system for human and machine interface according to an embodiment of the present invention.

Referring to FIG. 3, which is a schematic diagram of a system 3 for human and machine interface according to an embodiment of the present invention. The system 3 includes a display device 12', a computing device 14', a hand-held inertial device (HHID) 21' and a 3D image capture device 22'. The 3D image capture device 22' may capture entire image of a body of a user 30, i.e. a motion object, as an image signal Img', and the image signal Img' together with a control signal Con' from the hand-held inertial device (HHID) 21' are input signals for calculating a cursor position of the interactive software inside the computing device 14' which may consist of the combination of a system integration and GUI module 241', a control signal process unit 23', an image signal processing unit 24', a display process unit 142'. The image signal Img' and the control signal Con' may also be the input signals for recognizing a gesture of the user 30 during a period of time. The display device 12' is integrated in the system 3 for virtual visual experience. The entire image of the body of the user 30 may include motion of limbs or trunk and the control signal Con' from the HHID 21' may include inertial datum, button or joystick status. A process of the system integration and GUI module 241' may further analyze the input signals originated from a gesture or a motion of the user 30 after the image signal Img' or the control signal Con' is processed by the image processing unit 24' or the signal processing unit 23', to generate a compensated control signal CCon, wherein the process of the system integration and GUI module 241' may include (1) detecting the position of at least one of the trunk, limbs or wrists of the user 30 according to the image signal Img', (2) compensating the error of inertial datum of the control signal Con' by position detected, (3) detecting the 3D positions of the HHID 21', (4) compensating the inertial data by the 3D positions of the inertial device. The step (1) may be done by the image signal processing unit 24' or the system integration and GUI module 241' alternately according to different computing system design.

The system integration and GUI module 241' may also include a process to detect different gestures by continuous locations of at least one of trunk or limbs, wherein one of the locations may be recognized in one single image. For example, a gesture database stores gesture in format of an ordered series of acceleration, angular speeds or relative 3D positions, is provided for detecting different gestures.

The system integration and GUI module 241' may also include a process of recognizing operating action by the compensated inertial datum.

The system integration and GUI module 241' may further include a process of responding the recognized operating action or the button/joystick status. For example, if the system integration and GUI module 241' is included in an electronic game, the game may respond to recognized action of swinging of a racket with a tennis ball is hit or missed by sending output to the display device 12'. In some other embodiment of the invention, the output may include audio and force feedback outputs.

In FIG. 3, the control signal Con' may be transmitted to the computing device 14' by electromagnetic radiation, e.g. radio frequency (RF) signals; however it may be transmitted in a wired connection as well. The control signal Con' from the HHID 21' may include at least one of the following: joystick movement, button pressed/released, acceleration or angular speed to make a more complicated operation. According to different types of connection, the HHID 21' and the computing device 14' have corresponding input and output interfaces, for example: wired or wireless interface.

In FIG. 3, the 3D image capture device 22' may consist of 2 cameras. However, with the technology advanced, 3D images can be obtained by a single 3D camera, such that the 3D image capture device 22' can only include a single 3D camera. And the display device 12' may receive the output from the display processing unit 142'; a cursor may be displayed on the display device 12', the position of the cursor may be controlled by the HHID 21', for example, a desired direction and position of the HHID 21' may be an initial position for setting the cursor to the center of display device 12'. Changing the direction of the HHID 21' may move the cursor to different position of the display device 12' by one of the methods known in the art.

Figure 4:
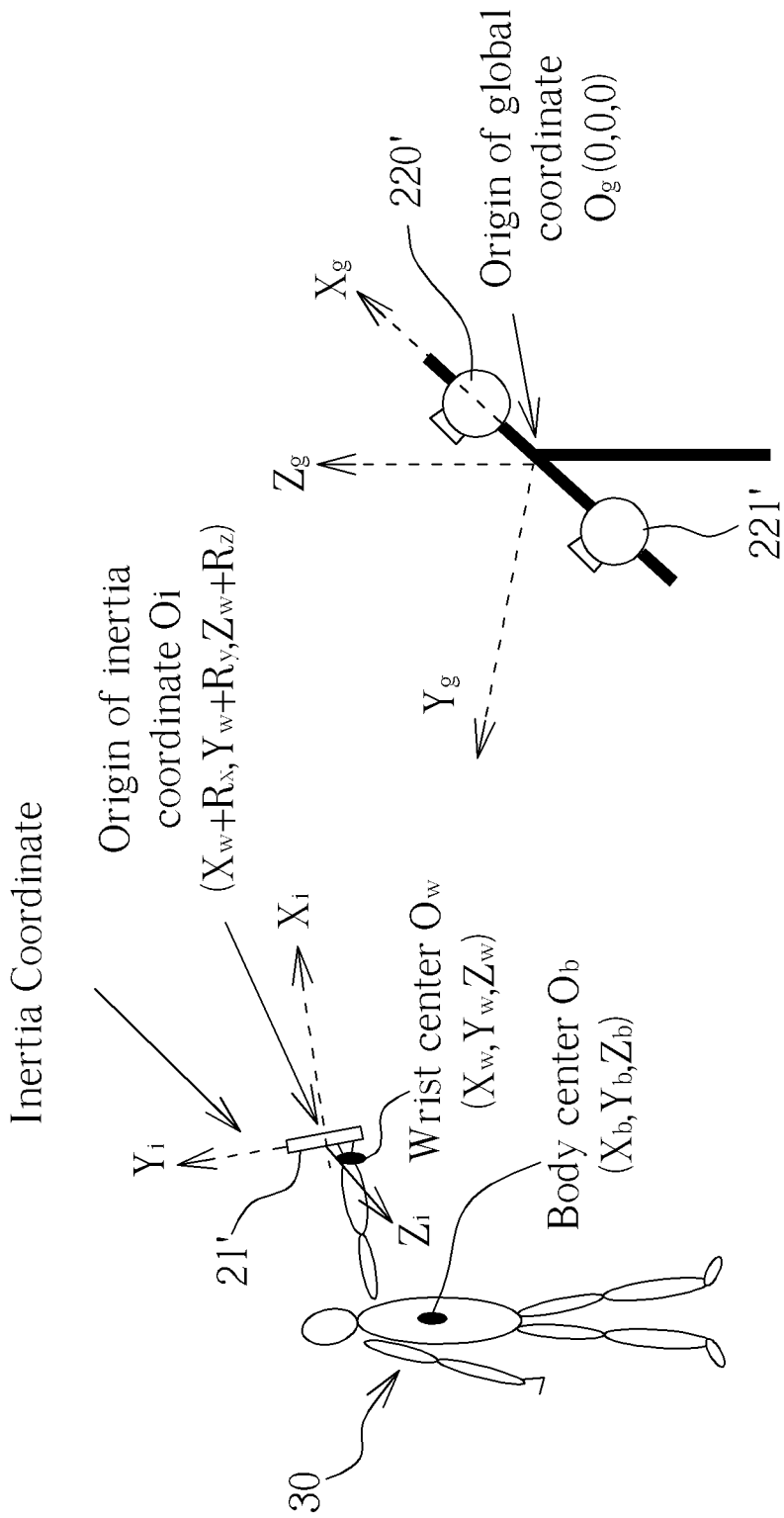
FIG. 4 is a diagram showing some possible references mentioned in the invention.
Figure 5:
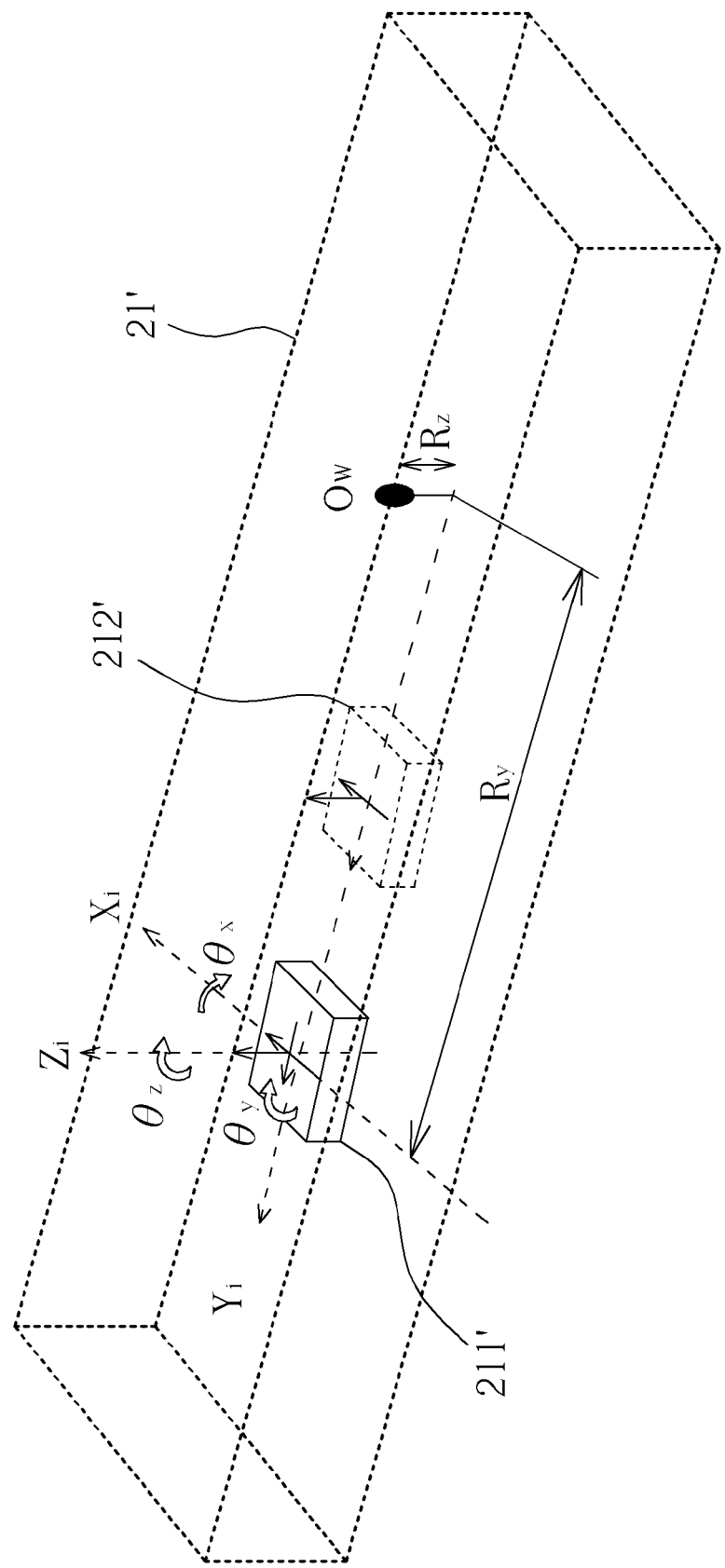
FIG. 5 is a transparent view of an exemplary hand-held inertial device shown in FIG. 3.

Referring to FIG. 4, the direction of cameras 220' and 221' is the same. A global coordinate system (hereinafter referring as GCS) with its origin $O_g$, 3 axes $X_g$, $Y_g$ and $Z_g$ is defined as: the origin is at the center of the camera 220' and the camera 221'; the $X_g$ axis is along the virtual connection between centers of the camera 220' and the camera 221', the $Y_g$ axis is orthogonal to the $X_g$ axis and along the direction of camera 220' and 221'; the $Z_g$ axis is orthogonal to both the $X_g$ axis and the $Y_g$ axis and its positive direction is backward to the ground. A local coordinate system (hereinafter referring as ICS) with its origin $O_i$, 3 axes $X_i$, $Y_i$ and $Z_i$ is defined for internal components (gyroscope, acceleration meter) of the HHID 21', which is illustrated in FIG. 5. A body center $O_b$ of the user 30 has its reference position in point $(x_b, y_b, z_b)$ in the GCS, wherein $x_b$, $y_b$, $z_b$ are variables. A wrist center $O_w$ of the user 30 has its reference position in point $(x_w, y_w, z_w)$ in the GCS, wherein $x_w$, $y_w$, $z_w$ are variables. The origin of the ICS also has it reference position in point $(x_i, y_i, z_i)$, wherein $x_i$, $y_i$, $z_i$ are variables. In the case of replacing the camera 220' and the camera 221' with one 3D camera, the $Z_g$ axis is orthogonal to the ground, the $Y_g$ axis is along the same direction of the 3D camera and the $X_g$ axis is orthogonal to both the $Y_g$ and $Z_g$ axes, wherein the 3D camera always faces the user 30. It is appreciated to know adopting other arrangement of the axes might also implement the invention for those skilled in the art.

Figure 1:
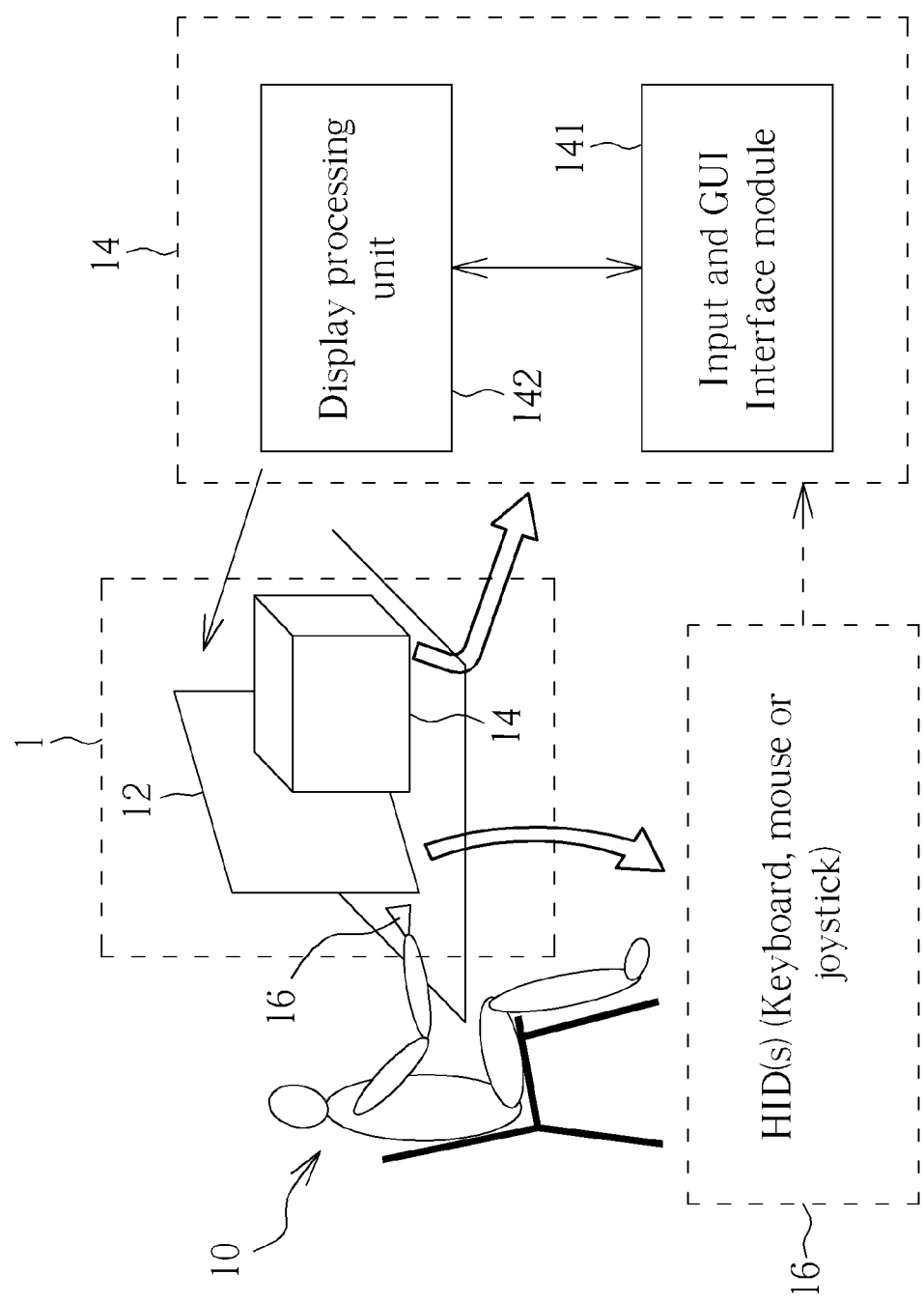
FIG. 1 is an illustration of a traditional human and machine interaction.
Figure 2A:
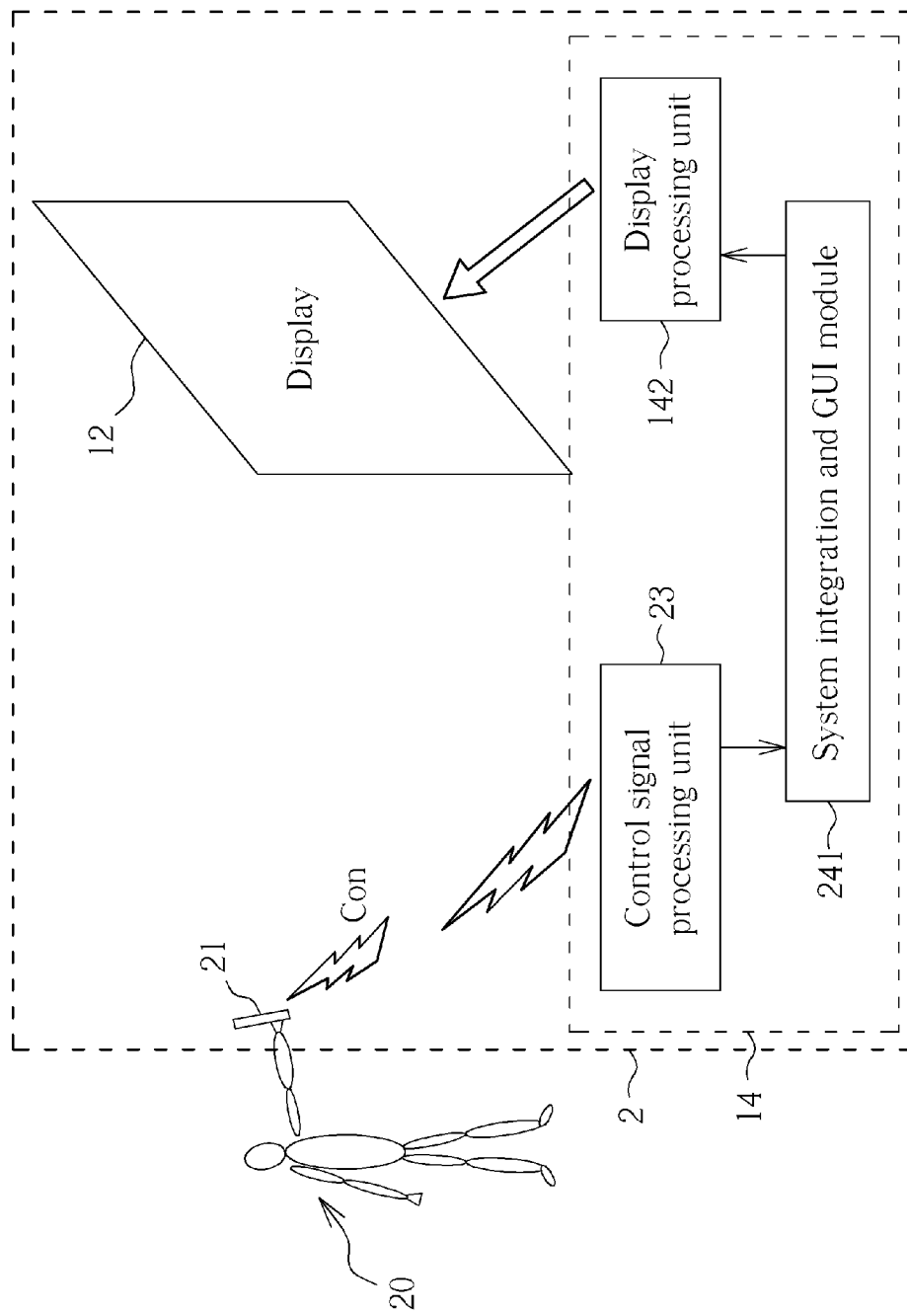
FIG. 2a is an illustration of a human and machine interaction taking advantages of an inertial device.
Figure 2B:
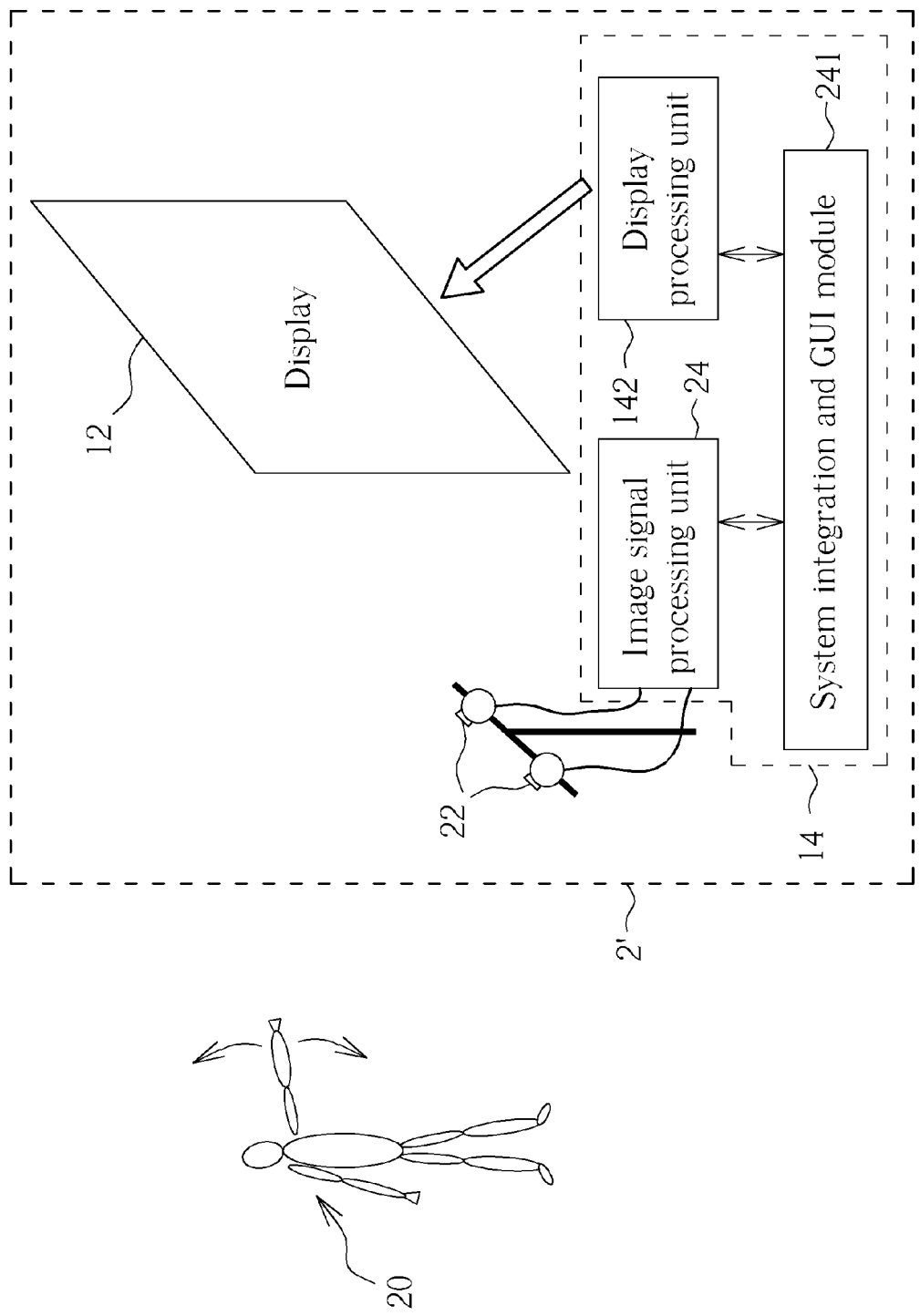
FIG. 2b is an illustration of a human and machine interaction taking advantages of user motion detection.

Referring to FIG. 5, a transparent view of the HHID 21' in FIG. 4. An acceleration meter 211' and a gyroscope 212' are located in the ICS as illustrated. Since there is a fixed offset $(R_x, R_y, R_z)$ between the wrist center $O_w$ and the origin $O_i$, the origin $O_i$ has its reference position in point $(x_w+R_x, y_w+R_y, z_w+R_z)$ in the GCS. Back to FIG. 4, the premise of the solution in FIG. 2a is that the body center $O_b$ is fixed. According to the premise, the inertial signal of the control signal Con' is mainly generated by the relative movement between the wrist center $O_w$ (or the origin $O_i$) and the body center $O_b$, such premise works only in pure hand actions, such as swinging a ball. If a gesture is composed by movements of both body and hand, an additional fictitious force (acceleration or rotation) generated will affect the gesture recognition, for example, body movement without motion of hand will also generate fictitious force as well. Furthermore, if a virtual role inside a virtual environment built in the computing device 14' in FIG. 3 has to move forward or backward, the solution in FIG. 2 has to setup buttons for controlling movement of the virtual role. As a result, the solution is obviously poor in virtual reality experience.

Still referring to FIG. 4, the invention locates the body center $O_b$ and the wrist center $O_w$ by a public 3D image measuring algorithm, and let $O_{bi}$ and $O_{wi}$ designate the locations of the body center $O_b$ and the wrist center $O_w$ at system operation time i. As the operation time goes by, a series of number indicating different moments can be referred as 1, 2, . . . , n. And a series of $O_{bi}$ and a series of $O_{wi}$ designate the locations of the body center $O_b$ and the wrist center $O_w$ at the moment i accordingly. The series of $O_{bi}$ and the series of $O_{wi}$ are reference for recognizing and searching for operation actions predefined in interactive software inside the computing device 14', and may also be utilized in calculating speed, acceleration and rotation angle to compensate error of the inertial signal of the control signal Con'. Furthermore, they may also be utilized in advanced gesture recognition.

Figure 6:
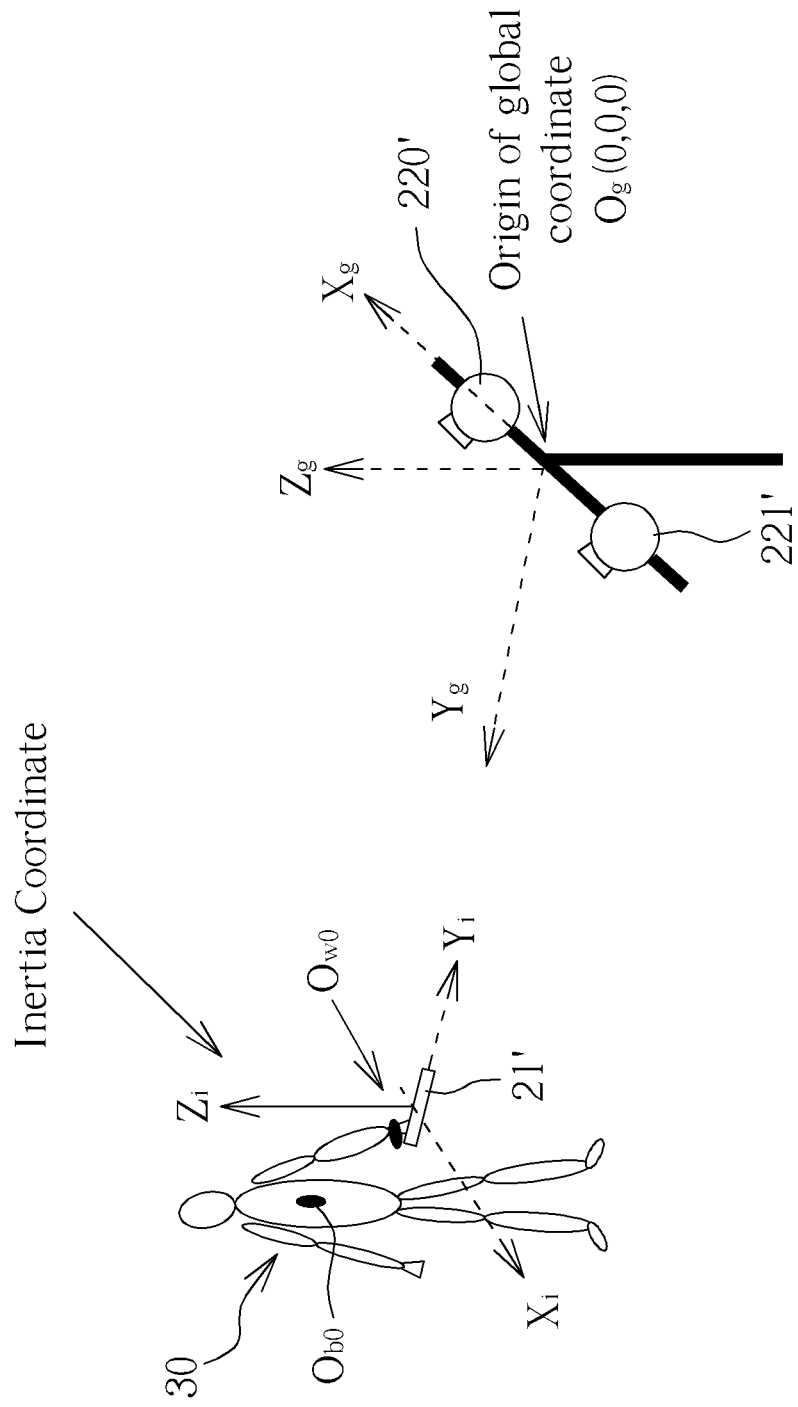
FIG. 6 illustrates the initialization of the invention.

The method of compensating error of the inertial signal of the control signal Con' is explained with FIG. 6 which illustrates the initial state of the invention.

First, the user 30 dangles his/her hand holding the HHID 21' naturally to make the axis $Y_i$ parallel to the axis $Y_g$, the axis $X_i$ parallel to the axis $X_g$ and the axis $Z_i$ parallel to the axis $Z_g$, wherein the positive directions of the axis $Y_i$ and the axis $Y_g$ are opposite to each other. Name the moment as 0 (i=0), record $O_{b0}$ and $O_{w0}$. Also record accelerations along 3 axes $(a_{x0}, a_{y0}, a_{z0})$ and angular speeds along 3 axes $(w_{x0}, w_{y0}, w_{z0})$ in the static state, wherein $a_{x0}, a_{y0}, a_{z0}$, is relative to the GCS and $w_{x0}, w_{y0}$ and $w_{z0}$ is relative to the ICS.

Second, record a series of $O_{bi}$ and a series of $O_{wi}$ as time goes by via 3D image measuring algorithm, wherein i=1, 2 . . . n. Also record a series of $(a_{xi}, a_{yi}, a_{zi})$ and a series of $(w_{xi}, w_{yi}, w_{zi})$ from the HHID 21', where in i=1, 2 . . . n. The records should be kept updated and in some cases, the value of n might be more than 100.

Third, in prior arts, detecting gestures requires several continuous records of $O_{bi}$ and $O_{wi}$ for match-searching in a gesture database, and detecting static state requires only comparing with $O_{b0}$ and $O_{w0}$. The invention adopts algorithms of gesture detection of the like.

Fourth, pure inertial detection usually assume $O_{bi}$ is always the same as $O_{b0}$ and only utilizes a series of accelerations and a series of angular speeds obtained from the HHID 21'. But actually the body of the user 30 always moves during interaction with the virtual system, that is, $O_{bi}$ is at a distance to $O_{b0}$. Hence the acceleration $(a'_{xi}, a'_{yi}, a'_{zi})$ and the angular speed $(w'_{xi}, w'_{yi}, w'_{zi})$ obtained from the HHID 21' are interfered by the body movement. To obtain correct acceleration and angular speed, the body movement effect may be removed according to following calculation (the procedure is also called "compensation"):

(1) The body center $O_{bi}$ at time i is designated as $(O_{bxi}, O_{byi}, O_{bzi})$ in the GCS, then the speed of body movement $(V_{bxi}, V_{byi}, V_{bzi})$ may be calculated as:

$$(V_{bxi}, V_{byi}, V_{bzi}) = ((O_{bxi} - O_{bxi-1})/dt, (O_{byi} - O_{byi-1})/dt, (O_{bzi} - O_{bzi-1})/dt),$$

wherein, i and i−1 designate to moments next to each other and dt is time different of i and i−1.

(2) The acceleration of the body $(a_{bxi}, a_{byi}, a_{bzi})$ may be calculated as:

$$(a_{bxi}, a_{byi}, a_{bzi}) = (V_{bxi} - V_{bxi-1})/dt, (V_{byi} - V_{byi-1})/dt, (V_{bzi} - V_{bzi-1})/dt).$$

(3) The compensated acceleration is calculated as:

$$(a_{xi}, a_{yi}, a_{zi}) = (a'_{xi}, a'_{yi}, a'_{zi}) - (a_{bxi}, a_{byi}, a_{bzi}).$$

Figure 7:
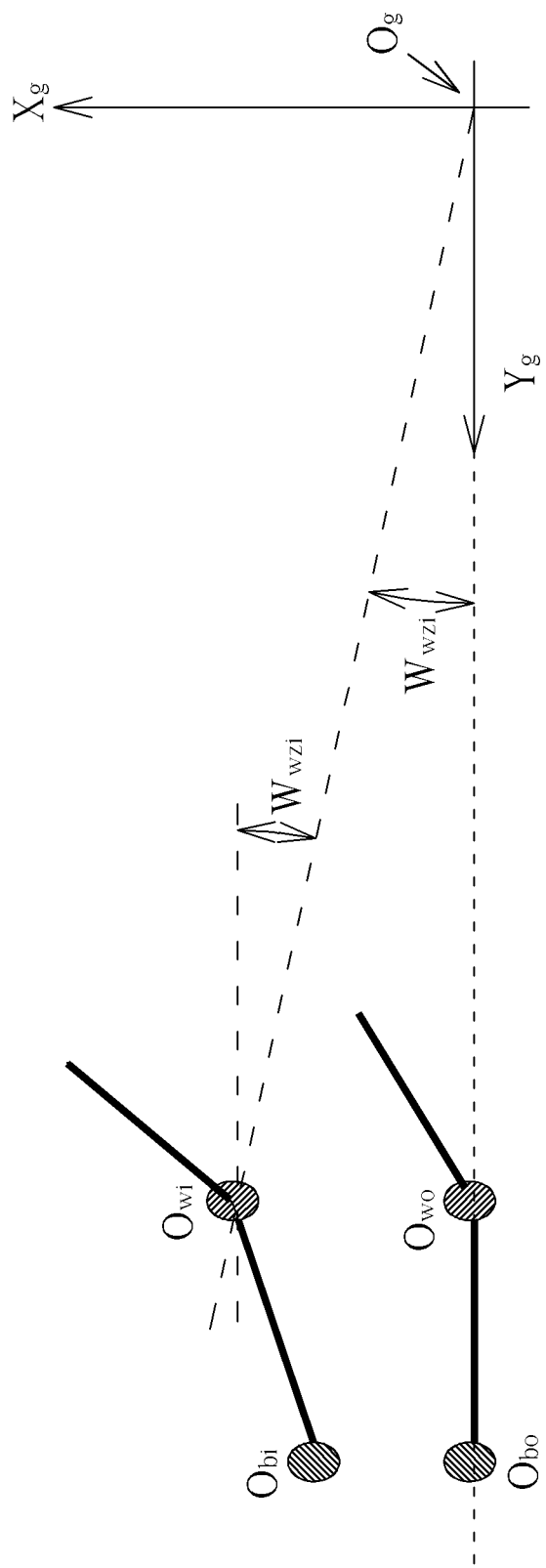
FIG. 7 illustrates the idea of compensating angular speed.

Refer to FIG. 7. The effect of body movement rotation to the angular speed is similar to the acceleration effect. The method first locates the wrist center $O_{w0}$ at the initial state. When the rotation center axis is $Z_g$, the generated $w'_{zi}$ by the gyroscope 212' is not zero (i.e. $W_{wzi}$) even there is no relative movement between the body center $O_b$, the wrist center $O_w$ and the HHID 21' as shown in FIG. 7, therefore $W_{wzi}$ should be considered in the compensation. As a result, the true angular speed $(w_{xi}, w_{yi}, w_{zi})$ can be calculated as:

$$(w_{xi}, w_{yi}, w_{zi}) = (w'_{xi}, w'_{yi}, w'_{zi}) - (w_{wxi}, w_{wyi}, w_{wzi}),$$

wherein $(w_{wxi}, w_{wyi}, w_{wzi})$ is calculated by mathematic algorithms known in the art by utilizing $O_{wxi}, O_{wxi-1}, O_{wyi}, O_{wyi-1}, O_{wzi}$ and $O_{wzi-1}$ certainly.

Another application of the invention is cursor control in a virtual system. The invention assumes the user wrist remains fixed to the origin $O_g$ during cursor controlling time. Accumulated errors of inertial data integration derail the cursor after a period of operating time, and a general solution for the derailing is to provide a reset button and asking the user 30 to follow a reset procedure, for example to aim the HHID 21' to the center of the display device 12' and push the reset button. Such reset procedure is cumbersome. The invention compensates the calculated cursor position with the same idea:

Before cursor initialization, set up an LED, an IR emitter or a mark which is easy detected on front or apparent part of the HHID 21'.

First step of the cursor initialization is: An initial operation as illustrated in FIG. 6, point the HHID 21' along a desired direction of the user 30 for setting the cursor to the center of the display device 12', then record an initial position of a mark $O_{m0}$ (corresponding to an initial 3D position of the HHID 21') by a captured image, and record a static acceleration $(a_{x0}, a_{y0}, a_{z0})$ and an angular speed $(w_{x0}, w_{y0}, w_{z0})$, make sure the cursor is at the center of the display device 12'.

Second step of the cursor initialization is to match image and display resolution. Control the HHID 21' to move the cursor to right border of the display device 12' and record a right position of the mark as $O_{mr}$ (corresponding to a right position of the HHID 21'); control the HHID 21' to move the cursor to left border of the display device 12' and record a left position of the mark as $O_{ml}$ (corresponding to a left position of the HHID 21'); control the HHID 21' to move the cursor to top border of the display device 12' and record a top position of the mark as $O_{mu}$ (corresponding to a top position of the HHID 21'); control the HHID 21' to move the cursor to bottom border of the display device 12' and record a bottom position of the mark as $O_{md}$ (corresponding to a bottom position of the HHID 21'). The width resolution of display device 12' is matched to distance between the right position of the mark $O_{mr}$ and the left position of the mark $O_{ml}$; the height resolution of display device is matched to distance between the top position of the mark $O_{mu}$ and the bottom position of the mark $O_{md}$, thus the proportion between display resolution and the HHID 21' movement is known.

Two extra rules are added to a cursor calculation method: (1) automatic reset is done by resetting the cursor to the center of the display device 12' when an position of the mark moves near the initial position of the mark $O_{m0}$ (i.e. a 3D position of the HHID 21' is close to the initial 3D position of the HHID 21' within a specific distance), wherein the specific distance between the position of the mark and the initial position of the mark $O_{m0}$ is not larger than 5 pixels and the distance may be a 3D distance or a 2D distance between the projections of them in a plane, (2) when position of the HHID 21' is out of range of rectangle bordered by $O_{mr}$, $O_{ml}$, $O_{mu}$ and $O_{md}$, leashing the cursor on the border of the display device 12' until the HHID 21' is back to the rectangle area constituted by $O_{mr}$, $O_{ml}$, $O_{mu}$ and $O_{md}$.

Step 142: The capture module 406 periodically receives HDMI_P1~HDMI_Pn.

Figure 8:
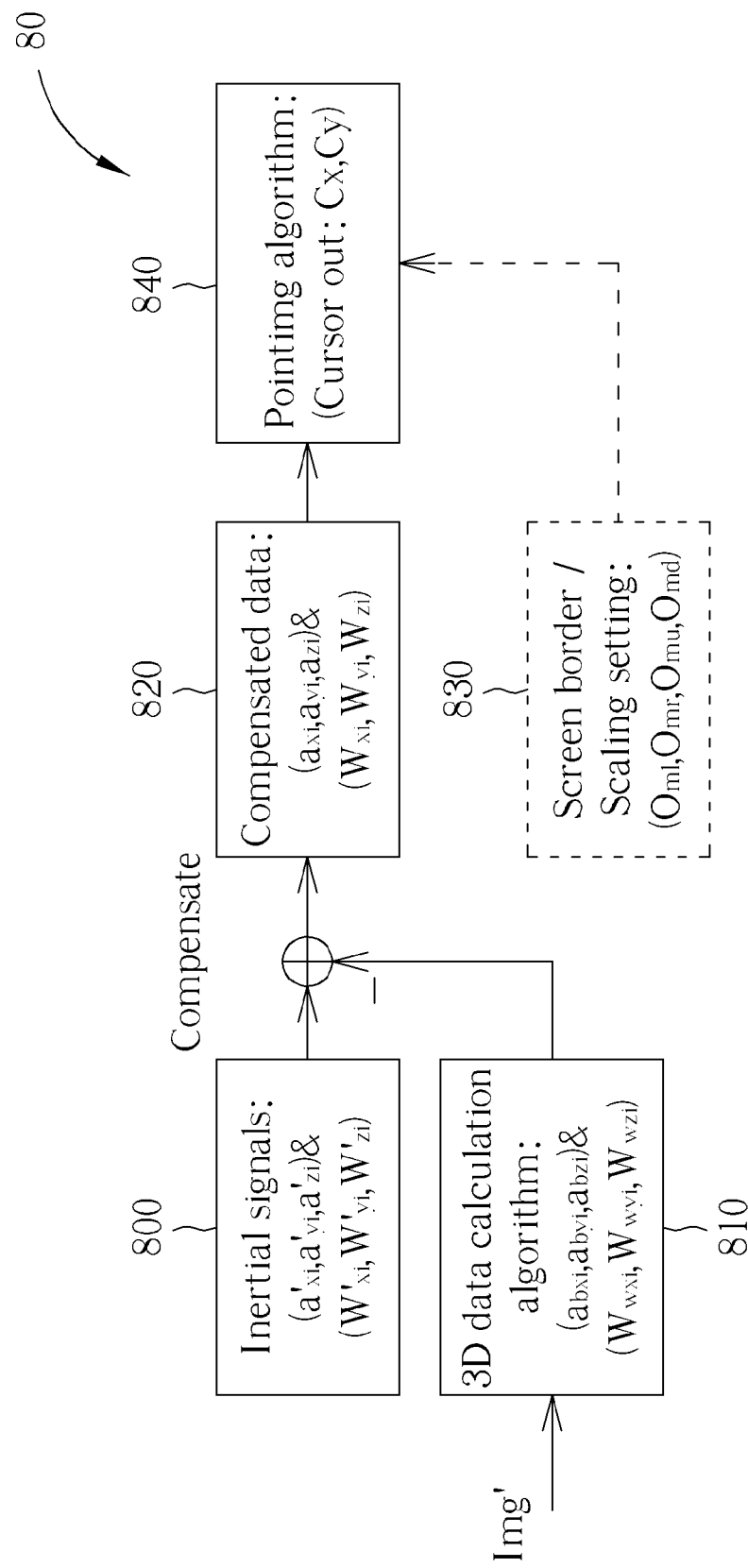
FIG. 8 is a cursor positioning process 80 according to an embodiment of the present invention.

Referring to FIG. 8, which is a cursor positioning process 80 according to an embodiment of the present invention. The cursor positioning process 80 includes the following steps:

Step 801: Obtain the 3D acceleration ($a'_{xi}$, $a'_{yi}$, $a'_{zi}$) and the 3D angular speed ($w'_{xi}$, $w'_{yi}$, $w'_{zi}$) from the HHID 21'.

Step 810: Calculate the 3D acceleration ($a_{bxi}$, $a_{byi}$, $a_{bzi}$) of the body center and the 3D angular speed ($w_{wxi}$, $w_{wyi}$, $w_{wzi}$) of the wrist according to the aforesaid methods.

Step 820: Calculate the compensated acceleration ($a_{xi}$, $a_{yi}$, $a_{zi}$) and the compensated angular speed ($w_{xi}$, $w_{yi}$, $w_{zi}$) according to the aforesaid method.

Step 830: Obtained $O_{mr}$, $O_{ml}$, $O_{mu}$ and $O_{md}$ from cursor initialization described above.

Step 840: Calculate 2D cursor position ($C_x$, $C_y$) by the compensated acceleration ($a_{xi}$, $a_{yi}$, $a_{zi}$) and compensated angular speed ($w_{xi}$, $W_{yi}$, $w_{zi}$) with two extra rules described above.

The calculation of $C_x$ and $C_y$ may be done by one of acceleration method and angular speed method. For example, the rotation amount (angle) along axis $X_i$ and axis $Z_i$ are derived by:

$$\theta_{zi} = f(W_{zi} - W_{z0}),$$

$$\theta_{zi} = f(W_{xi} - W_{x0}),$$

and $C_x$ and $C_y$ is calculated by:

$$C_x = S_w \times (z_i / R_w)$$

$$C_y = S_h \times (x_i / R_h),$$

wherein, $S_w$ is width of the display device and $S_h$ is the height of the display device, $R_w$ and $R_h$ are constants for fitting human wrist motion.

Another example of calculating the cursor position by the accelerations may be:

$$\theta_{xi} = \sin^{-1}((a_{yi} - a_{y0})/g),$$

wherein g is the gravitational constant, then apply the same $C_x$ and $C_y$ calculation method.

Figure 9:
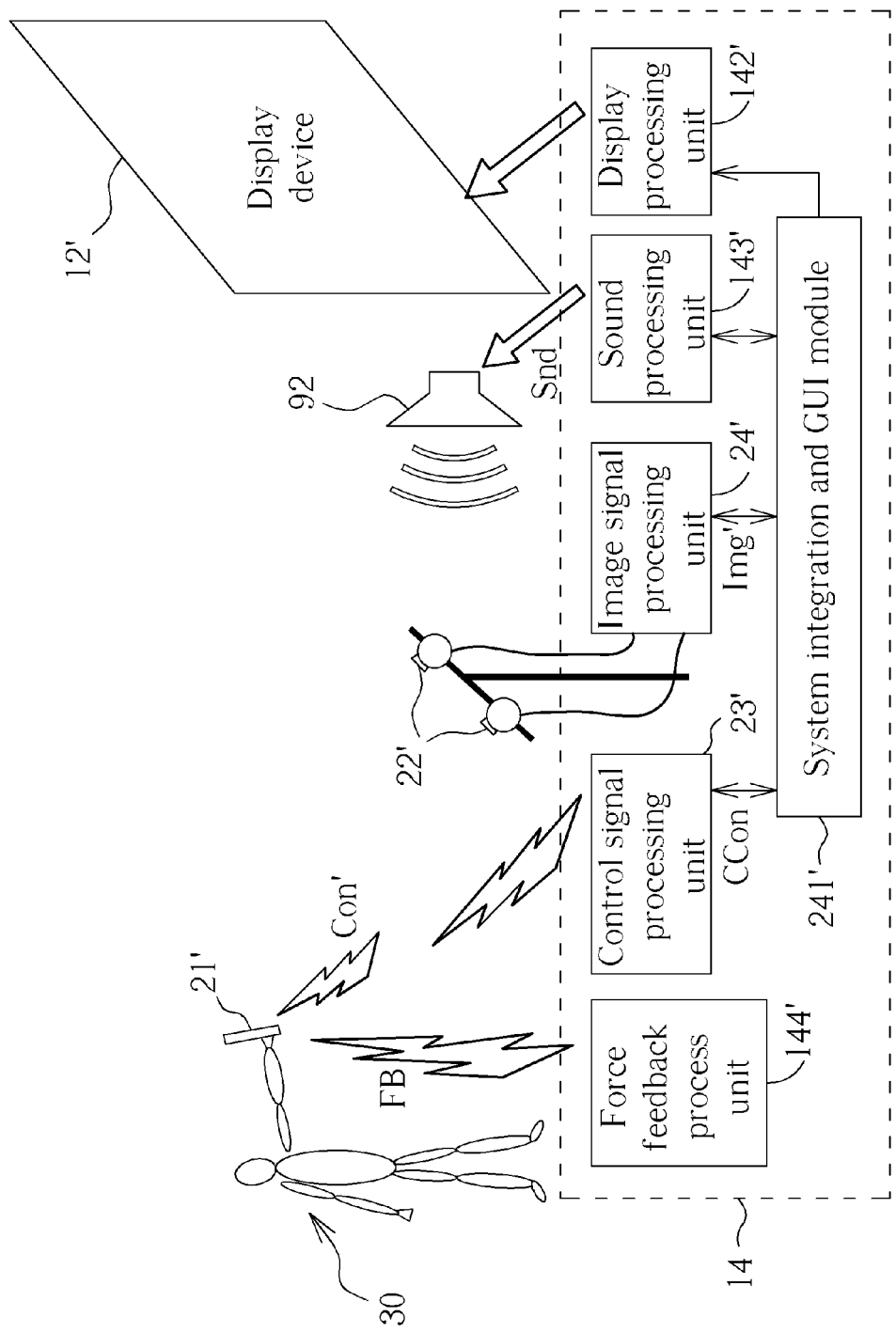
FIG. 9 is a schematic diagram of a system for human and machine interface according to an alteration of the present invention.
Figure 10:
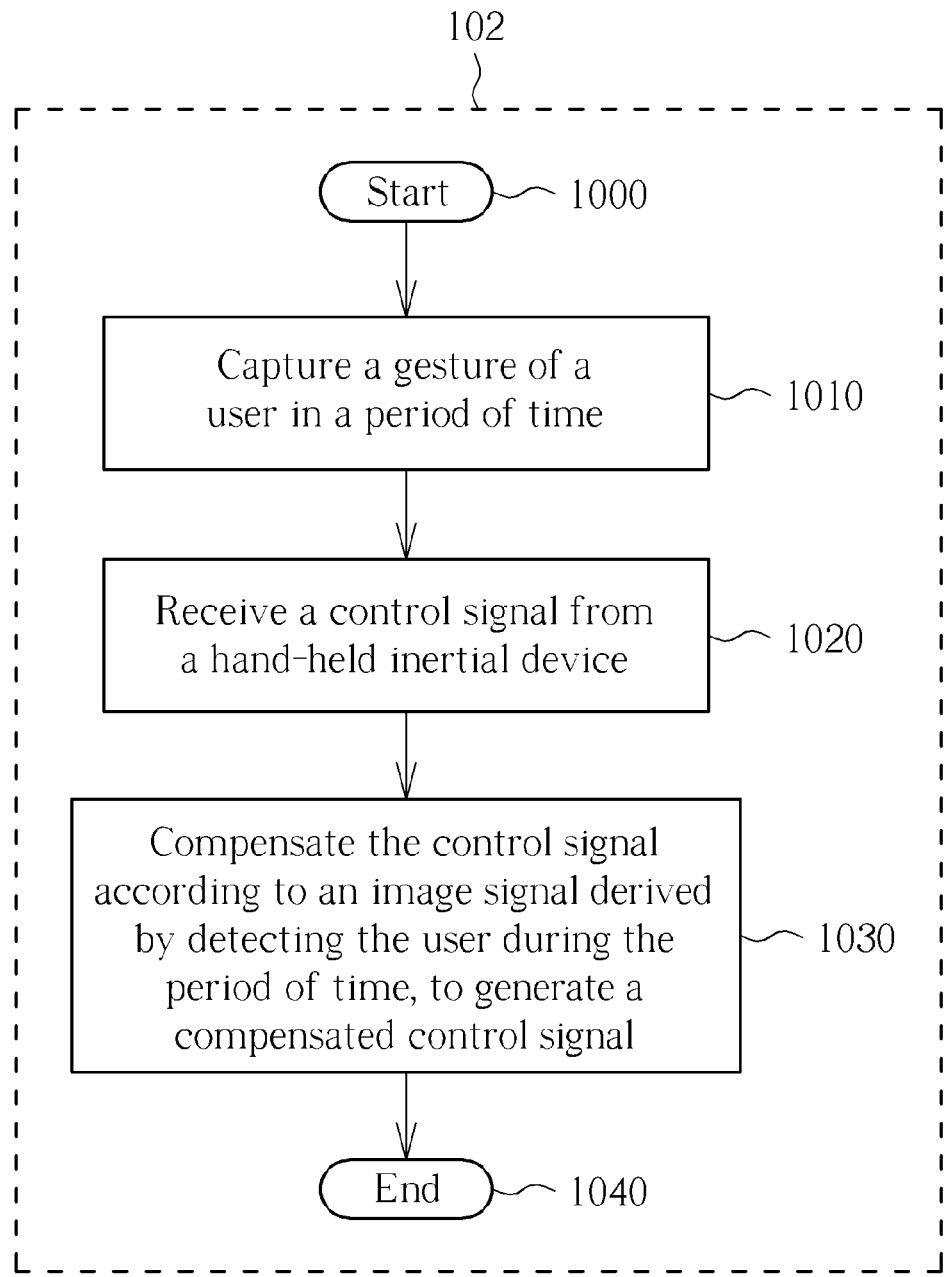
FIG. 10 is a compensating process according to an embodiment of the present invention.

Referring to FIG. 9, one example of the invention may further include a speaker 92 and a sound processing unit 143' that outputs a sound data Snd to the speaker 92 in device 14', or the example may further include a force feedback device 90 and a force feedback process unit 144' that outputs feedback data FB to the force feedback device 90, wherein the force feedback device 90 is usually integrated with the HHID 21'. It is certain that both the speaker 92 and the force feedback device 90 may be included in the invention to improve an even more realistic experience, however in some applications, even the display device 12' may not be necessary, for example a virtual jazz drum system. The interaction experience improved by the scenario may include a more accurate HHID position detection, a gesture input for detecting more accurate user force corresponding to the outputs to the speaker 90 and the force feedback device 90, and so on.

Operations of the system 3 can be summarized into a compensating process 100. The compensation process 102 includes the following steps:

Step 1000: Start.
Step 1010: Capture a gesture of a user in a period of time.
Step 1020: Receive a control signal from a hand-held inertial device.
Step 1030: Compensate the control signal according to an image signal derived by detecting the user during the period of time, to generate a compensated control signal.
Step 1040: End.

Detailed operations of the compensation process 100 can be derived by referring to the above description.

In the prior art, body movement influences control signals of the hand-held inertial HID, and some control requires button or joystick operation. Therefore, virtual reality experience can not be fully achieved. In comparison, the present invention detects the user' movement, e.g. positions of body and wrist (i.e. the HHID) to compensate control signals of the HHID, such that actual operations of the HHID can be determined. Furthermore, the present invention can further detect positions of the HHID to automatically reset the curser without a resetting button, so as to increase convenience.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for human and machine interface, comprising:
   a 3-dimensional (3D) image capture device, for capturing a gesture of a motion object in a period of time;
   a hand-held inertial device (HHID), for transmitting a control signal comprising a first 3D acceleration and a first 3D angular speed; and
   a computing device, comprising:
      a system integration and GUI module, for compensating the control signal according to an image signal corresponding to the motion object during the period of time, to generate a compensated control signal, wherein the motion object comprises a body center and a wrist center close to the HHID, and the image signal comprises a first series of 3D locations of the body center and a second series of 3D locations of the wrist center.

2. The system of claim 1, wherein the computing device further comprises an image signal processing unit for detecting action of the motion object to generate the image signal, and system integration and GUI module detects positions or gestures of the motion object according to the image signal.

3. The system of claim 1, wherein the system integration and GUI module calculates a second 3D acceleration and a second 3D angular speed according to the first series of 3D locations, and the second series of 3D locations, respectively; and the compensated control signal comprises a first compensated 3D acceleration and a compensated 3D angular speed, which the system integration and GUI module calculates by subtracting the second 3D acceleration from the first 3D acceleration and subtracting the second 3D angular speed from the first 3D angular speed, respectively.

4. The system of claim 3, wherein the system integration and GUI module further obtain a series of first compensated 3D accelerations and a series of compensated 3D angular speeds, and further comprises a gesture database utilized for searching the gesture of the motion object in the gesture database.

5. The system of claim 3, wherein the computing device records an initial 3D position of the HHID, and calculates a third 3D acceleration by the second series of 3D locations and calculates a second compensated 3D acceleration by subtracting the third 3D acceleration from the first 3D acceleration.

6. The system of claim 5 further comprises a display device for the computing device to output, wherein a cursor acts as a pointing tool in the display device and the computing device calculates a cursor position by the second compensated 3D acceleration or the compensated 3D angular speed.

7. The system of claim 6, wherein the computing device detects a 3D position of the HHID (3DPOHHID) and resets the cursor position to a display device center when the 3D position of the HHID detected is close to the initial 3D position of the HHID within a specific distance.

8. The system of claim 6, wherein the motion object sets the cursor position at a display device center with the HHID pointing along a desired direction of the motion object, and controls the HHID to move the cursor to right, left, top and bottom borders of the display device to record right, left, top and bottom positions of the HHID.

9. The system of claim 8, wherein the computing device detects a 3DPOHHID and leashes the cursor on one border of the display device until the HHID is back to an area of a rectangle bordered by the right, left, top and bottom positions of the HHID when the 3DPOHHID detected is out of a range of the rectangle.

10. A method for human and machine interface, comprising:
capturing a gesture of a motion object in a period of time;
receiving a control signal comprising a first 3D acceleration and a first 3D angular speed from a hand-held inertial device (HHID); and
compensating the control signal according to an image signal derived by detecting the motion object during the period of time, to generate a compensated control signal, wherein the motion object comprises a body center and a wrist center close to the HHID, and the image signal comprises a first series of 3D locations of the body center and a second series of 3D locations of the wrist center.

11. The method of claim 10, wherein the step of compensating the control signal according to the image signal derived by detecting the motion object, to generate the compensated control signal comprises:
calculating a second 3D acceleration and a second 3D angular speed according to the first series of 3D locations, and the second series of 3D locations, respectively.

12. The method of claim 11, wherein the step of compensating the control signal according to the image signal derived by detecting the motion object, to generate the compensated control signal comprises:
calculating a first compensated 3D acceleration and a compensated 3D angular speed by subtracting the second 3D acceleration from the first 3D acceleration and subtracting the second 3D angular speed from the first 3D angular speed of the compensated control signal, respectively.

13. The method of claim 12 further comprising the steps of obtaining a series of first compensated 3D accelerations and a series of compensated 3D angular speeds, and utilizing a gesture database to search the gesture of the motion object in the gesture database.

14. The method of claim 12 further comprising recording an initial 3D position of the HHID, and calculates a third 3D acceleration by the second series of 3D locations and calculates a second compensated 3D acceleration by subtracting the third 3D acceleration from the first 3D acceleration.

15. The method of claim 14 further comprising:
outputting on a display device; and
calculating a cursor position by the second compensated 3D acceleration or the compensated 3D angular speed;
wherein a cursor acts as a pointing tool in the display device.

16. The method of claim 15 further comprising:
detecting a 3D position of the HHID (3DPOHHID); and
resetting the cursor position to a display device center when the 3D position of the HHID detected is close to the initial 3D position of the HHID within a specific distance.

17. The method of claim 15 further comprising:
setting the cursor position at a display device center with the HHID pointing along a desired direction of the motion object; and
controlling the HHID to move the cursor to right, left, top and bottom borders of the display device to record right, left, top and bottom positions of the HHID.

18. The method of claim 17 further comprising:
detecting a 3DPOHHID and leashing the cursor on one border of the display device until the HHID is back to an area of a rectangle bordered by the right, left, top and bottom positions of the HHID when the 3DPOHHID detected is out of a range of the rectangle.

* * * * *